July 6, 1965 R. J. TURNER 3,193,708

ASYNCHRONOUS PULSE GENERATOR EMPLOYING CAPACITY DIODES

Filed March 6, 1963

INVENTOR.
ROLAND J. TURNER

BY B. L. Zangwill
ATTY.

Howard W. Hermann
AGENT.

United States Patent Office 3,193,708
Patented July 6, 1965

3,193,708
ASYNCHRONOUS PULSE GENERATOR EMPLOYING CAPACITY DIODES

Roland J. Turner, Bucks County, Pa., assignor, by mesne assignments, to the United States of America as represented by the Secretary of the Navy Filed Mar. 6, 1963, Ser. No. 263,364
2 Claims. (Cl. 307—88.5)

The present invention relates to pulse generating circuits and more particularly to pulse generating circuits utilizing solid-state diodes.

In high speed computer applications, there has been a recognized need for nanosecond pulse generators having a range of repetition rates which may vary as much as 500 megacycles. In the Digest of Technical Papers of the 1960 International Solid-State Circuits Conference at pages 50 and 51, there is described a pulse generator circuit utilizing a high speed diode possessing a nonlinear voltage vs. capacity characteristic. The pulse generator in this circuit employs a low Q tuned circuit secondary to drive the diode and makes use of the rapid transition observed in the reverse recovery current of the diode resulting from the transition in capacity that the diode possessed as the voltage across the diode dropped to zero. As a result of this capacity variation, the off-going diode no longer possesses the capacity to maintain the charge obtained when it was forward biased. The natural consequence is that the current in the secondary loop is forced to change rapidly.

The present invention is a circuit for pulse generation which is useful in high speed sampling systems and is based on the phenomenon described in the aforementioned paper. The present invention, however, allows production of short pulses to be generated at any repetition rate in a broad band without the necessity of tuning the secondary. Provision is also made at the end of the pulse forming line for obtaining either positive or negative pulses or both simultaneously.

Accordingly, a primary object of this invention is the provision of a nanosecond pulse generator possessing waveform and polarity control and which is capable of operating over a wide range of high repetition rates.

Other objects and many of the attendant advantages of this invention will be readily appreciated as the same becomes better understood by reference to the following detailed description when considered in connection with the accompanying drawings in which like reference numerals designate like or corresponding parts throughout the figures thereof and wherein.

Figures 1, 3:
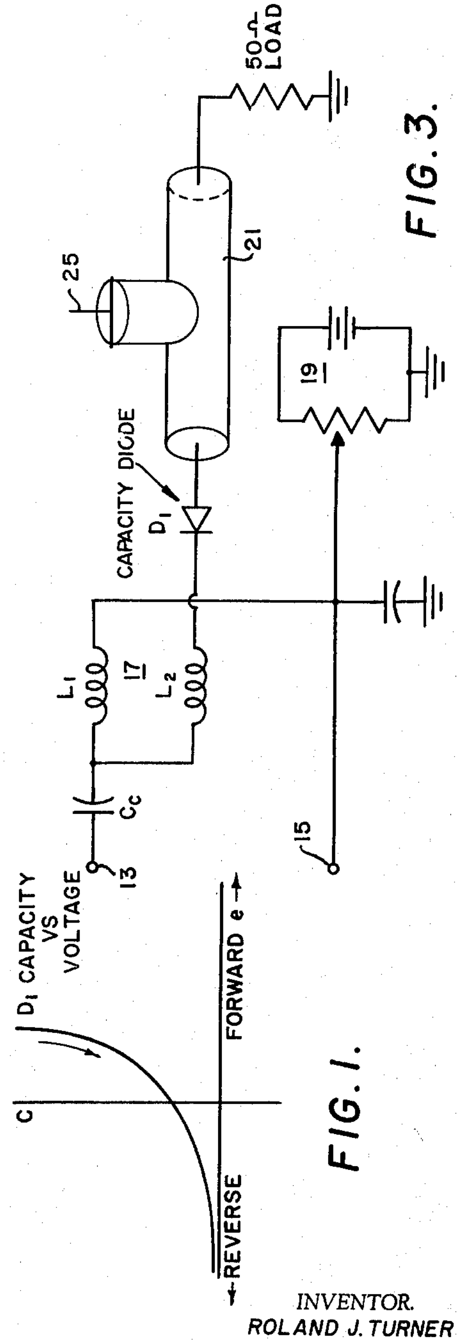
FIG. 1 is a graph showing the type of voltage vs. capacitance characteristic of the type of diode utilized in the present invention.
FIG. 3 is a schematic circuit diagram of a modification of the embodiment shown in FIG. 2.

Referring now to the drawings, there is shown in the graph of FIG. 1 a plot of a typical variation of capacitance as a function of voltage for a diode of the type used in the present invention. It will be seen that as the voltage across the diode drops from a forward voltage through zero to a reverse voltage the capacity drops rapidly. It is this characteristic which forms a basis for the circuit of the present invention.

Figure 2:
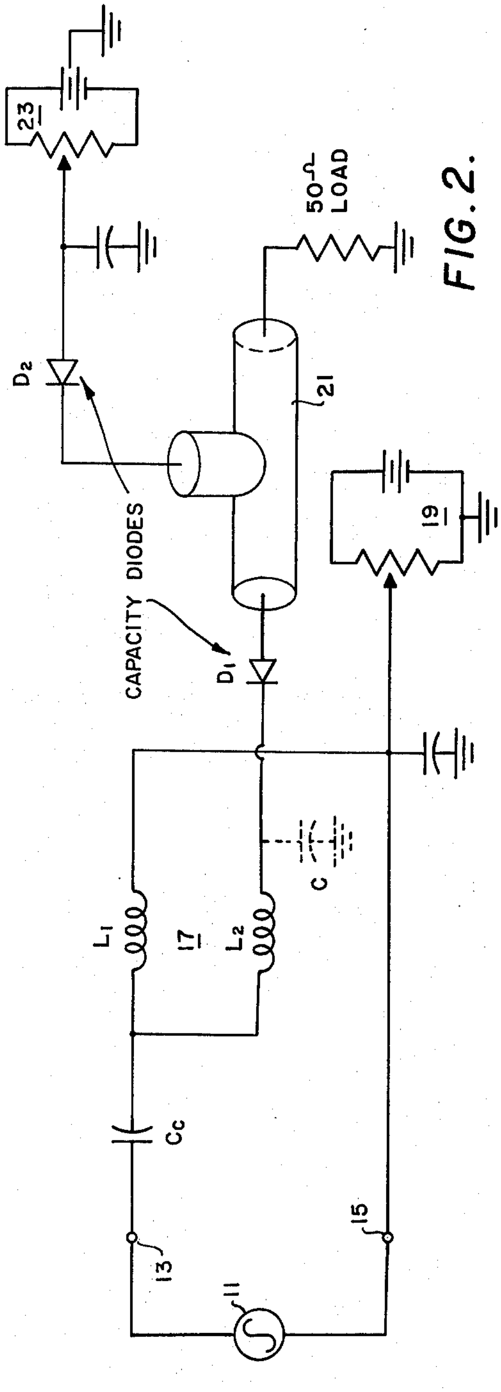
FIG. 2 is a schematic circuit diagram of an embodiment of the present invention.

Referring now to FIG. 2, there is shown a schematic circuit diagram of the present invention. In this circuit a sinusoidal signal from an input signal producing means 11 is applied to a pair of input terminals 13, 15 and fed through a coupling capacitor $C_c$ to a transmission line transformer 17 which comprises a primary coil having inductance $L_1$ and a secondary coil having inductance $L_2$. The secondary inductance of the transmission line transformer 17 must be low (25 to 50 nanohenries). The inductance of $L_1$ should also be less than 50 nanohenries.

The current through the secondary loop is fed into a diode $D_1$ of the type having a voltage vs. capacity characteristic similar to that shown in FIG. 1. This type of diode is known as a "nonlinear capacity diode." A type used in a specific embodiment was a Sylvania 4–D4121.

A bias voltage for the diode $D_1$ may be supplied from a bias voltage supply 19. The bias voltage supply is utilized to apply a forward bias to the diode to bias it in the high capacity region. Upon application of a sine wave the diode is driven to cut-off resulting in a rapid transition in the capacity as the diode swings through zero. This gives rise to a current pulse in the secondary which passes through a transmission line 21 and is sensed across a 50 ohm load.

The transmission line 21 in this embodiment utilizes means comprising a stub termination circuit to develop pulses of positive or negative polarity or develop simultaneously a double time function. The stub termination means shown in FIG. 2 comprises a second high frequency biased diode $D_2$ with biasing means comprising an associated bias circuit 23. The variation of the diode bias results in a variation of the stub termination impedance thereby varying the degree of differentiation observed in the generated pulse. This controls the waveform and polarity of the pulse.

FIG. 3 shows a modification of the circuit of FIG. 2 wherein the stub of the transmission line 21 ends in a short circuit termination 25. This provides a non-variable type pulse output for any given frequency.

With the present invention, the input circuit to the diode is broad band (roughly 1–500 megacycles in bandwidth) and the output becomes short pulses of 1 to 2 nanoseconds duration at repetition rates which may vary over the entire input bandwidth, without any necessity for tuning the secondary.

With the use of a variable impedance termination on the stub of the transmission line, it is possible to vary the type of wave forms produced at the load, since the phase of the reflected pulse in the stub is changed by a change of the terminating impedance at the end of the stub.

It is also possible to permit a high frequency circulating current in the transformer secondary by placing a capacitor C as shown in broken lines in FIG. 2 of the drawings. This capacitor may, for example, have a capacitance of 2 to 5 micromicrofarads. This permits rapid rise of the voltage pulse across the 50 ohm load as the capacity of $D_1$ drops.

Other modifications and variations of the invention are possible in the light of the above teachings. It is therefore to be understood that within the scope of the appended claims the invention may be practiced otherwise than as specifically described.

I claim:

1. A pulse generating circuit comprising:

means for producing an input signal;

a transmission line transformer having primary and secondary coils and having its primary coil connected to said means producing said input signal;

a nonlinear capacity diode connected to the secondary coil of said transmission line transformer;

means for biasing said diode in the high capacity region of said diode;

a transmission line connected to the output of said diode;

a load resistance connected to the output of said transmission line;

said transmission line being provided with a stub containing a termination;

means for controlling the waveform of the signal passing through said transmission line connected to the termination of said stub, said means comprising a second nonlinear capacity diode connected to said stub; and means for controlling the bias on said second diode.

2. A pulse generating circuit comprising:

a pair of input terminals for accepting a sinusoidal input signal;

a transmission line transformer having primary and secondary coils, the primary coil being connected in a primary circuit interconnecting said input terminals;

a nonlinear capacity diode connected to the secondary coil of said transmission line transformer;

means for biasing said diode in the high capacity region of said diode;

a transmission line having a stub connected to the output of said diode;

waveform means for shaping the signal transmitted through said transmission line;

a load connected to the output of said transmission line;

a variable terminating impedance means connected to said stub, said variable terminating impedance means comprising a second nonlinear capacity diode;

bias voltage producing means for said diode; and means for varying the bias applied to said diode.

References Cited by the Examiner

UNITED STATES PATENTS

| | | | |
|---|---|---|---|
| 2,968,011 | 1/61 | Schouten et al. | 333—20 |

OTHER REFERENCES

Solid State Circuits Conference Digest of Technical Papers, February 1960, pages 50, 51, FIG. 6.

ARTHUR GAUSS, *Primary Examiner.*